United States Patent
Itakura et al.

(10) Patent No.: US 11,449,378 B2
(45) Date of Patent: Sep. 20, 2022

(54) INFORMATION PROCESSING APPARATUS AND LOG CONTROL METHOD

(71) Applicant: FUJITSU LIMITED, Kawasaki (JP)

(72) Inventors: Kota Itakura, Kawasaki (JP); Miwa Okabayashi, Sagamihara (JP); Hisatoshi Yamaoka, Kawasaki (JP); Eiichi Takahashi, Kawasaki (JP); Kazuki Matsui, Kawasaki (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/884,108

(22) Filed: May 27, 2020

(65) Prior Publication Data

US 2020/0379832 A1     Dec. 3, 2020

(30) Foreign Application Priority Data

May 31, 2019    (JP) .............................. JP2019-102944

(51) Int. Cl.
     *G06F 11/00*      (2006.01)
     *G06F 11/07*      (2006.01)
     *G06F 9/48*       (2006.01)

(52) U.S. Cl.
     CPC ........ *G06F 11/0769* (2013.01); *G06F 9/4881* (2013.01); *G06F 11/0721* (2013.01)

(58) Field of Classification Search
     CPC ............. G06F 11/0769; G06F 11/0721; G06F 11/3048; G06F 9/4881
     See application file for complete search history.

(56) References Cited

U.S. PATENT DOCUMENTS

2006/0168481 A1    7/2006   Nemoto
2011/0067008 A1*   3/2011   Srivastava .......... G06F 11/3636
                                                   717/128
2014/0108087 A1    4/2014   Fukui et al.
(Continued)

FOREIGN PATENT DOCUMENTS

JP      H07-93182 A     4/1995
JP      2006-202076 A    8/2006
JP      2006-236231 A    9/2006
(Continued)

OTHER PUBLICATIONS

Gupta, Sumit et al., "Chapter 2: Getting Acquainted with Storm Getting Acquainted with Storm", In: "Real-Time Big Data Analytics", Feb. 26, 2016, Packt Publising, Limited, vol. 23, pp. 23-45, XP055708233.
(Continued)

*Primary Examiner* — Philip Guyton
(74) *Attorney, Agent, or Firm* — Fujitsu Patent Center

(57) ABSTRACT

An information processing apparatus includes: a memory and a processor. The processor, coupled to the memory, is configured to: determine, for each task of a plurality of tasks executed in a distributed stream data processing platform, a log score based on an indication associated with easiness of occurrence of a failure; and output a log message for each task of the plurality of tasks at an output frequency based on a log score of each task and a log score of at least one of an upstream task located upstream of each task and a downstream task located downstream of each task.

6 Claims, 17 Drawing Sheets

(56) References Cited

U.S. PATENT DOCUMENTS

2017/0106530 A1* 4/2017 Shimokawa ............ G06F 11/00

FOREIGN PATENT DOCUMENTS

| JP | 2009-110156 A | 5/2009 |
| JP | 2013-206117 A | 10/2013 |
| JP | 2014-081811 A | 5/2014 |

OTHER PUBLICATIONS

Extended European Search Report dated Jul. 7, 2020 for corresponding European Patent Application No. 20175981.8, 8 pages.
European Oral Proceedings dated Apr. 8, 2022 for corresponding European Patent Application No. 20175981.8, 7 pages.

* cited by examiner

NUMBER OF LOGS IS ACQUIRED FOR EACH TASK

TOTAL NUMBER OF LOGS 15000000

NUMBER OF LOGS IS TOTALIZED FOR EACH LOG SCORE

TOTAL NUMBER OF LOGS 15000000

10000000/15000000 = 2/3 TIMES

ADJUSTMENT IS MADE TO APPROACH TARGET LOG NUMBER

TARGET NUMBER OF LOGS 10000000

| UPSTREAM TASK ID | DOWNSTREAM TASK ID | LOG SCORE OF UPSTREAM TASK | MESSAGE FOR TASK PROCESSING |
|---|---|---|---|
| task_up 1 | task_down2 | 0.15 | (MESSAGE FOR EACH TASK) |

| UPSTREAM TASK ID | DOWNSTREAM TASK ID | LOG SCORE OF DIWNSTREAM TASK |
|---|---|---|
| task_up 1 | task_down2 | 0.25 |

| TASK ID | LOG SCORE |
| --- | --- |
| task_up 1 | 0.15 |
| task_up 2 | 0.3 |
| ... | ... |

| TASK ID | TIME STAMP | PROCESSING TIME | CPU UTILIZATION RATE |
|---|---|---|---|
| task_up 1 | 1552290587404 | 353ms | 2.2% |
| task_up 2 | 1552290583573 | 13ms | 0.1% |
| task_up 1 | 1552290582563 | 175ms | 1.7% |
| ... | ... | ... | ... |

| TASK ID | NUMBER OF OUTPUT |
|---------|------------------|
| task_up 1 | 1243 |
| task_up 2 | 13 |
| ... | ... |

| TASK ID | CORRECTION VALUE |
|---|---|
| task_up 1 | 0.5 |
| task_down2 | 0.5 |
| ... | ... |

| TASK ID | LOG SCORE | NUMBER OF OUTPUT |
|---------|-----------|------------------|
| task_up 1 | 0.15 | 1243 |
| task_up 2 | 0.3 | 13 |
| ... | ... | ... |

INFORMATION PROCESSING APPARATUS AND LOG CONTROL METHOD

CROSS-REFERENCE TO RELATED APPLICATION

This application is based upon and claims the benefit of priority of the prior Japanese Patent Application No. 2019-102944, filed on May 31, 2019, the entire contents of which are incorporated herein by reference.

FIELD

The embodiments discussed herein are related to an information processing apparatus, log control program, and a log control method.

BACKGROUND

In recent years, a large amount of data has been continuously generated due to an increase in an Internet of Things (IoT) device, and a streaming processing technology for executing processing the data continuously generated as an input has been developed. In a distributed stream data processing platform for executing such streaming processing, a plurality of tasks are coupled to each other, and a large amount of data is sequentially input to and processed by the tasks. For example, a developer may output a log for each task and each processing path by describing a code that outputs the log at the time of development of each task. The distributed stream data processing platform may include "Apache Storm" developed by Twitter Inc., and "Apache Hadoop" (Apache Hadoop is a collection of open-source software utilities that facilitate using a network of many computers to solve problems involving massive amounts of data and computation quoted from Wikipedia), for example.

In this regard, a technology related to the output of the log has been known (for example, Japanese Laid-open Patent Publication No. 2009-110156 and Japanese Laid-open Patent Publication No. 2013-206117).

Related techniques are disclosed in, for example, Japanese Laid-open Patent Publication No. 2014-81811.

SUMMARY

According to an aspect of the embodiments, an information processing apparatus includes: a memory; and a processor, coupled to the memory, configured to: determine, for each task of a plurality of tasks executed in a distributed stream data processing platform, a log score based on an indication associated with easiness of occurrence of a failure; and output a log message for each task of the plurality of tasks at an output frequency based on a log score of each task and a log score of at least one of an upstream task located upstream of each task and a downstream task located downstream of each task.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8A and FIG. 8B are diagrams illustrating a message between tasks according to the embodiment;

FIG. 9 is a diagram illustrating score information according to the embodiment;

FIG. 10 is a diagram illustrating task execution information according to the embodiment;

FIG. 11 is a diagram illustrating log count information according to the embodiment;

FIG. 12 is a diagram illustrating a log score correction message according to an embodiment;

FIG. 13 is a diagram illustrating a tabulation request response message according to the embodiment;

DESCRIPTION OF EMBODIMENTS

However, the developer has determined how to output the log of the task at the time of development. Therefore, it is difficult to predict a state at the time of an operation of a task, so that a log may be acquired excessively to increase a load on a distributed stream data processing platform, sufficient log may not be acquired, thereby making it difficult to perform the verification later. The distributed stream data processing platform is also called as the distributed stream data processing base.

Hereinafter, some embodiments of the present disclosure will be described in detail with reference to the drawings. The corresponding components in a plurality of the drawings are denoted by the same reference signs.

Figure 1:
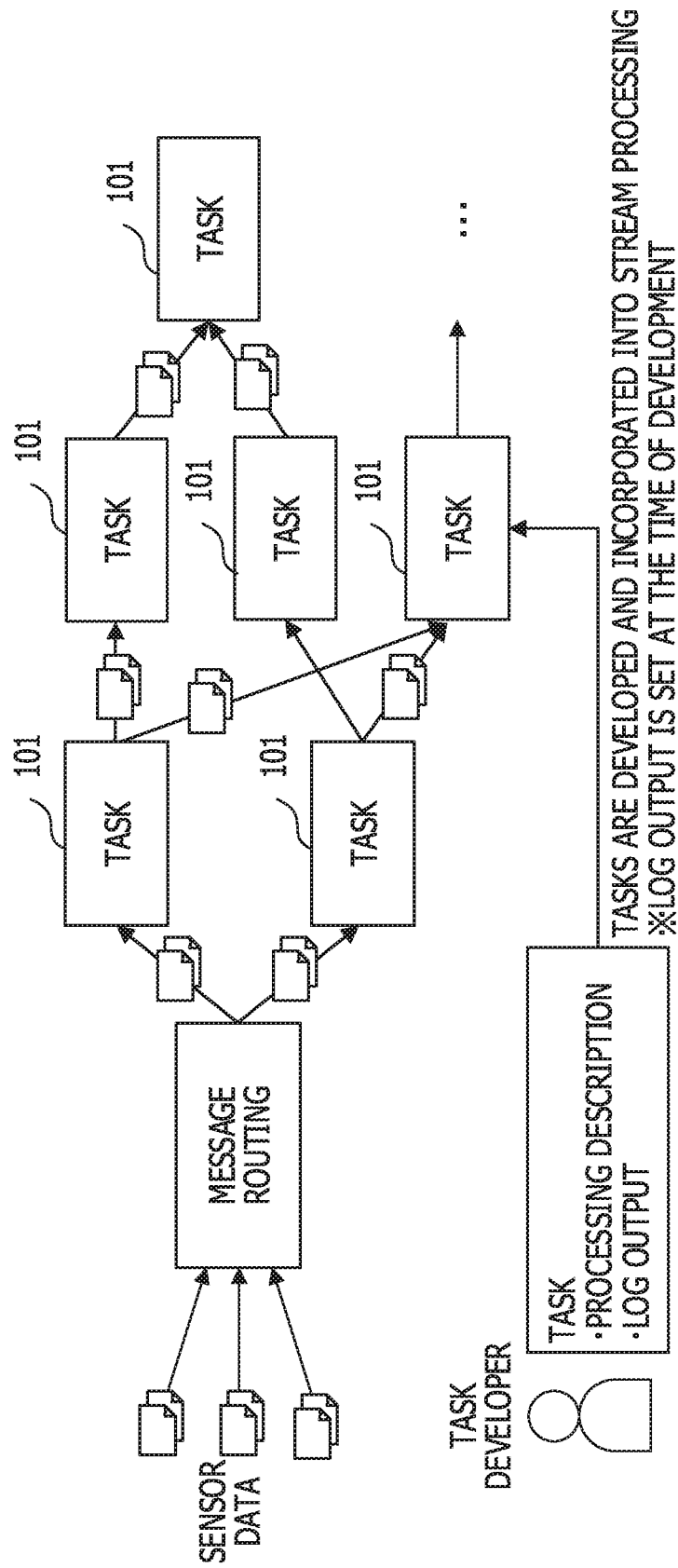
FIG. 1 illustrates an exemplary distributed stream data processing platform.

As described above, in the distributed stream data processing platform, a plurality of tasks are coupled to each other, and a large amount of data is input to these tasks to be processed one after another. FIG. 1 illustrates an exemplary distributed stream data processing platform. In the distributed stream data processing platform, a plurality of tasks 101 are coupled to each other, and data generated by a sensor or the like is input to and processed by the task 101 according to a predetermined routing. For example, a developer of the task 101 may output a log for each task and each processing path by describing a code that outputs the log when describing a program for processing executed in the task 101. When an abnormality occurs in the processing of the task 101, it is possible to pursue the cause by using the data of the output log.

However, the developer has determined, for example, how to output the log of the task 101 at the time of the development. Therefore, it is difficult to predict the situation at the time of the operation of the task 101, and it may be difficult to acquire the log, increase the load on the distributed stream data processing platform, or acquire a sufficient log, thereby making it difficult to investigate the cause at the time of occurring a failure or the like. Therefore, there is a demand for providing a technology capable of improving the efficiency of log acquisition.

In the embodiments described below, for each task 101, a log score is calculated based on the state of the task 101. The log score may be, for example, a value obtained by evaluating a possibility that the task 101 is associated with a failure. The log score may, in one example, be calculated based on an indication associated with the occurrence of a failure in the task 101.

Figure 2:
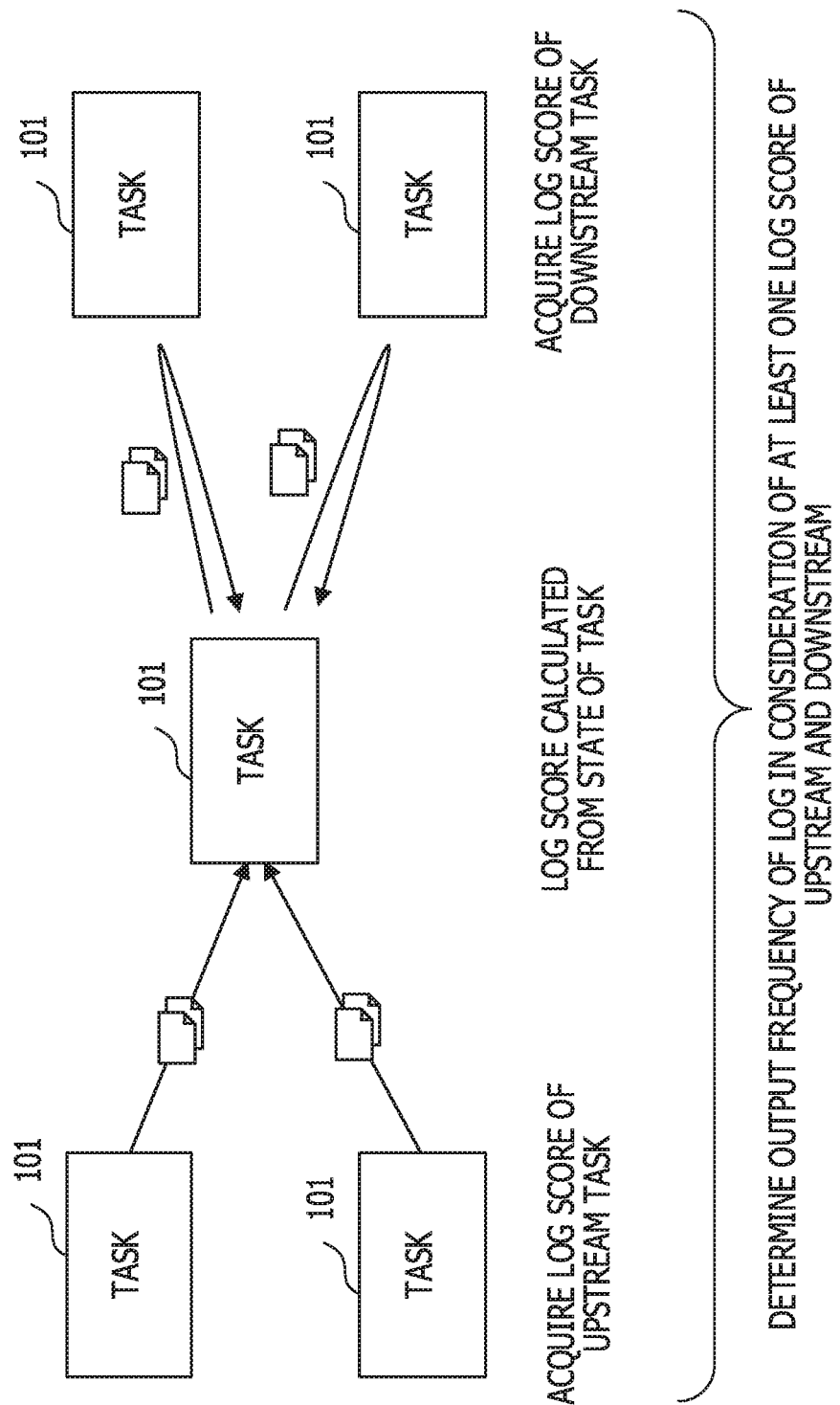
FIG. 2 is a diagram illustrating a determination of an output frequency of a log according to an embodiment.

In the embodiment, the output frequency of the log of the task 101 is determined based on, for example, the log score of the task 101 and the log score of at least one task 101 upstream and the downstream side of the task 101. FIG. 2 is a diagram illustrating a determination of an output frequency of a log according to an embodiment. As illustrated in FIG. 2, the output frequency of the log of the task 101 may be determined in consideration of the log score of the task 101 and the log score of at least one of the upstream task 101 located upstream of the task 101 and the downstream task 101 located downstream of the task 101. By determining the output frequency of the log in consideration of the log score of at least one of the tasks 101 upstream and the downstream side, it is possible to efficiently collect logs of the plurality of tasks 101 included in the distributed stream data processing platform. The upstream task 101 of the tasks 101 may be, for example, a task 101 that is disposed before the task 101 in the routing, and may be a task 101 that inputs data used in the processing of the task 101. The downstream task 101 of the task 101 may be, for example, a task 101 that is an output destination of data obtained in the processing of the task 101, and the processing of the downstream task 101 may be executed by using data obtained by processing the task 101. Hereinafter, the embodiments will be described in more detail.

Figure 3:
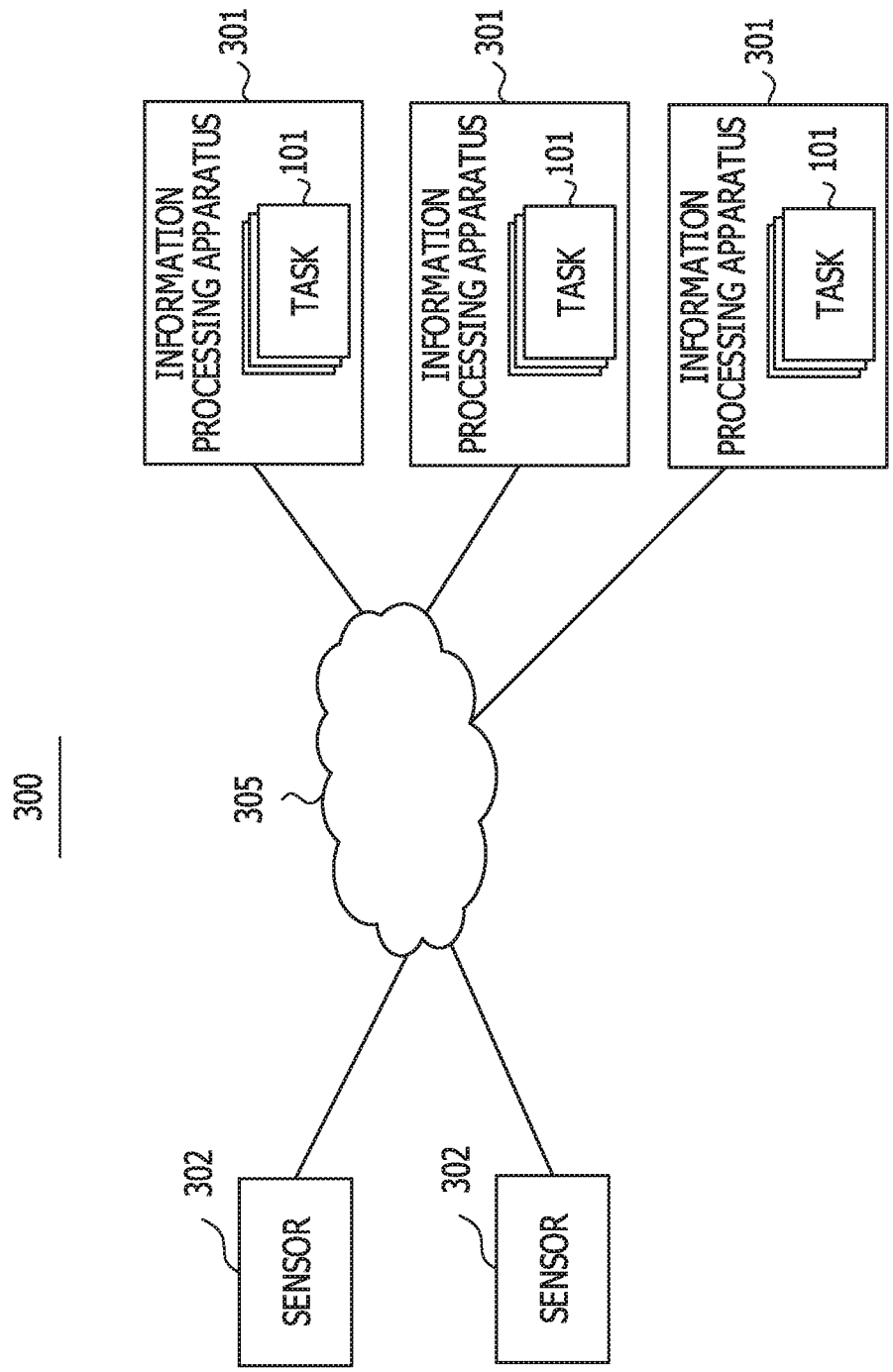
FIG. 3 is a diagram illustrating the distributed stream data processing platform according to the embodiment.

FIG. 3 is a diagram illustrating a distributed stream data processing platform 300 according to the embodiment. The distributed stream data processing platform 300 may include, for example, at least one information processing apparatus 301 and at least one sensor 302. The information processing apparatus 301 and the sensor 302 are coupled to each other via a network 305 so as to be able to communicate with each other, for example. The sensor 302 may be, for example, an IoT device, and transmits sensed sensing data to a predetermined information processing apparatus 301 specified as a destination. At least one task 101 among the plurality of tasks 101 included in the distributed stream data processing platform 300 may be provided in the information processing apparatus 301. For example, the information processing apparatus 301 may input the sensing data received from the sensor 302 to the provided task 101 and process the received sensing data according to a predetermined routing.

Figure 4:
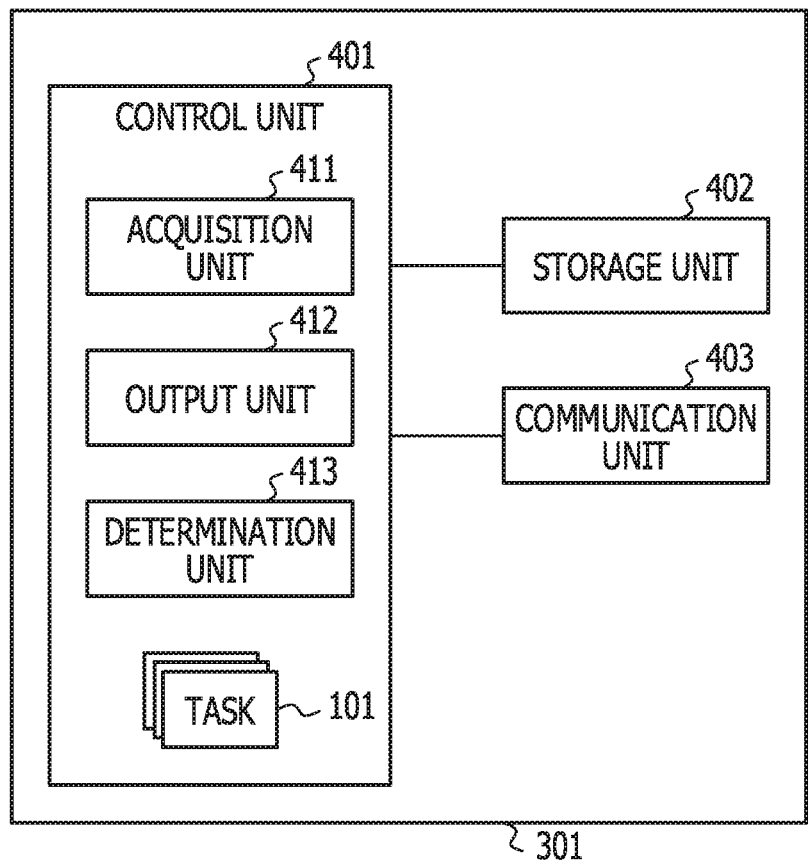
FIG. 4 is a diagram illustrating a block configuration of an information processing apparatus according to the embodiment.

FIG. 4 is a diagram illustrating a block configuration of an information processing apparatus 301 according to the embodiment. The information processing apparatus 301 includes, for example, a control unit 401, a storage unit 402, and a communication unit 403. The control unit 401 executes, for example, the task 101 provided in the information processing apparatus 301. The control unit 401 may operate as, for example, an acquisition unit 411, an output unit 412, and a determination unit 413. The storage unit 402 may store, for example, information such as score information 900, task execution information 1000, log count information 1100, and log score correction message 1200, which will be described later with reference to FIGS. 9-12. For example, in a case where the information processing apparatus 301 operates as a management apparatus to be described later which executes the management of the distributed stream data processing platform 300, the storage unit 402 may store information such as a log score correction message 1200 and a tabulation request response message 1300 illustrated in FIG. 13. For example, the communication unit 403 communicates with the sensor 302 and other information processing apparatuses 301 via the network 305 in accordance with instructions from the control unit 401. These elements and information stored in the storage unit 402 will be described in detail later.

Figure 5A:
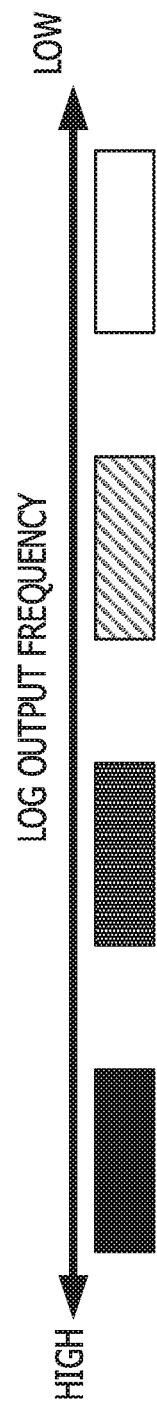
FIG. 5A and FIG. 5B are diagrams illustrating the determination of the output frequency of the log according to the embodiment.
Figure 5B:
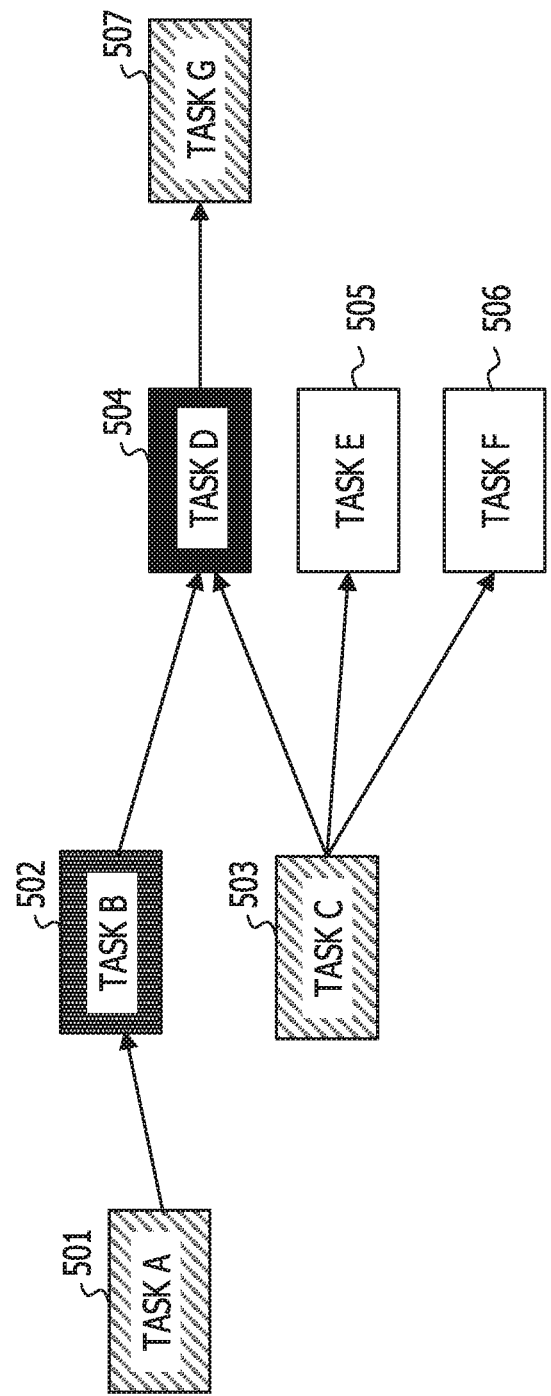

Next, the determination of the output frequency of the log according to the embodiment will be further described. FIG. 5A and FIG. 5B are diagrams illustrating the determination of the output frequency of the log according to the embodiment. In the embodiment, the control unit 401 of the information processing apparatus 301 calculates a log score for each of the tasks 101 provided in Its own apparatus. The log score may be calculated, for example, based on an indication associated with the occurrence of a failure in the task 101. In one example, the indication associated with the occurrence of a failure in the task 101 may be a load applied to a central processing unit (CPU), an amount of memory used, or the like. For example, in a case where a processing load of the CPU in executing the task 101 is high, or the amount of the memory used is large, it may be estimated that the task 101 is highly likely to cause a failure. Therefore, the control unit 401 may calculate a high log score in the task 101 in which the processing load of the CPU is high or the amount of the memory used is large. The CPU may be a single CPU, a multi CPU, or a multi-core CPU.

For example, in FIG. 5B, the plurality of tasks 101 of a task G506 from a task A501 are illustrated, and the control unit 401 of the information processing apparatus 301 included in the distributed stream data processing platform 300 may calculate the log score of the task G507 from the task A501. As illustrated in FIG. 5A, as the output frequency of the log is higher, the task 101 is represented by a darker color. For example, FIG. 5B illustrates a case where the highest log score is calculated in the task D504. In this case, the control unit 401 may set the output frequency of the log of the task D504 to a value higher than that of the other tasks 101.

For example, in a case where the log score of the task 101 on the downstream of a certain task 101 is high, the control unit 401 may increase the log score of the task 101. For example, in FIG. 5B, since the log score of the task D504 downstream of a task B502 is high, the control unit 401 may increase the log score of the task B502. The control unit 401 may determine the output frequency of the log of the task B502 based on the log score increased by the influence of the task D504 downstream. The reason for this is that in a case where the task D504 fails, the task D504 is the task 101 downstream of the task B502, and the task B502 may be the cause of the failure.

For example, when determining the output frequency of the log of the task C503, the control unit 401 considers the log scores of the task D504, the task E505, and the task F506 downstream. In this case, since the log score of the task C504 is high, the log score of the task C503 may be increased, but the other task E505 and task F506 downstream may not have a high log score, and therefore, the control unit 401 may not increase the log score of the task C503 that much. The control unit 401 may determine the output frequency of the log of the task C503 based on the log score slightly increased due to the influence of the task D504 downstream. For example, in a case where a failure occurs in the task D504, the task D504 is a task 101 downstream of the task C503, and thus the task C503 may be a cause of a failure, and the log score may be increased. However, since the task E505 and task F506 other than the task D504 among the three tasks 101 downstream of the task C503 are normally operated, it may be estimated that the task C503 is less likely to be an actual cause of the failure, so that the log score is not increased that much.

For example, when determining the output frequency of the log of the task G506, the control unit 401 considers the log scores of the task C504 upstream. In this case, since the log score of the task C504 is high, the log score of the task G507 may be increased. The control unit 401 may determine the output frequency of the log of the task G507 based on the log score slightly increased due to the influence of the task C504 upstream. The reason for this is that in a case where a failure occurs in the task D504, the log of the task G507 downstream of the task D504 is checked, so that the influence of the failure may be easily investigated.

In the example illustrated in FIG. 5B, as a result of increasing the log score of the task B502, the log score of the upstream task A501 is more increased as well.

As described above, in the embodiment, in the case where there is a task 101 that is estimated to have a high probability of occurrence of a failure, the log scores of the tasks 101 upstream and the downstream side are also adjusted to be increased. Based on the increased log score, the output frequency of the log is determined. For this reason, for example, it is assumed that a failure has actually occurred in the task 101, which is estimated to be highly likely to cause a failure. In this case as well, since the output frequency of the log of the task 101 with which the failure occurred and the log of at least one of the tasks 101 upstream and downstream side is increased, it is possible to efficiently investigate the cause of the failure and the influence of the failure.

Next, the adjustment of the total amount of the logs output from the distributed stream data processing platform 300 will be described. When the total amount of the logs output from the distributed stream data processing platform 300 is large, the load applied to the distributed stream data processing platform 300 is also increased. Therefore, it is preferable that the amount of the logs output from the distributed stream data processing platform 300 is adjusted so as to approximate the predetermined number of logs to be a target. In the embodiments described below, the processing for optimizing the amount of the log output from each task 101 is executed so that the total number of logs output in a predetermined period in the distributed stream data processing platform 300 approaches the predetermined number of logs. In one embodiment, the processing for optimizing the amount of logs may be executed by the management apparatus that executes the management of the distributed stream data processing platform 300, for example. In one example, the management apparatus may be an information processing apparatus 301 representing a plurality of information processing apparatuses 301.

Figure 6A:
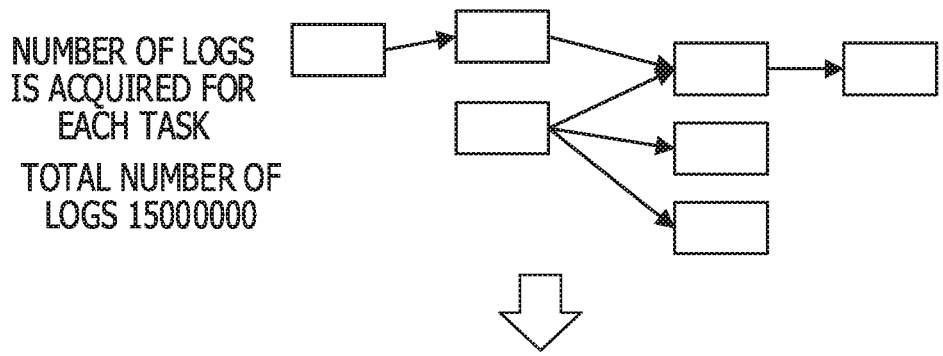
FIG. 6A to FIG. 6C are diagrams illustrating an example of adjustment of the entire log amounts of the distributed stream data processing platform according to the embodiment.
Figure 6B:
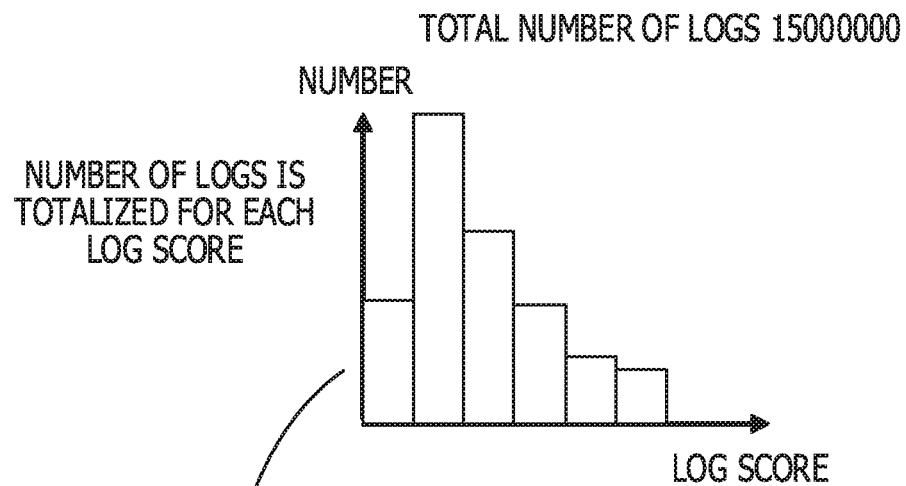
Figure 6C:
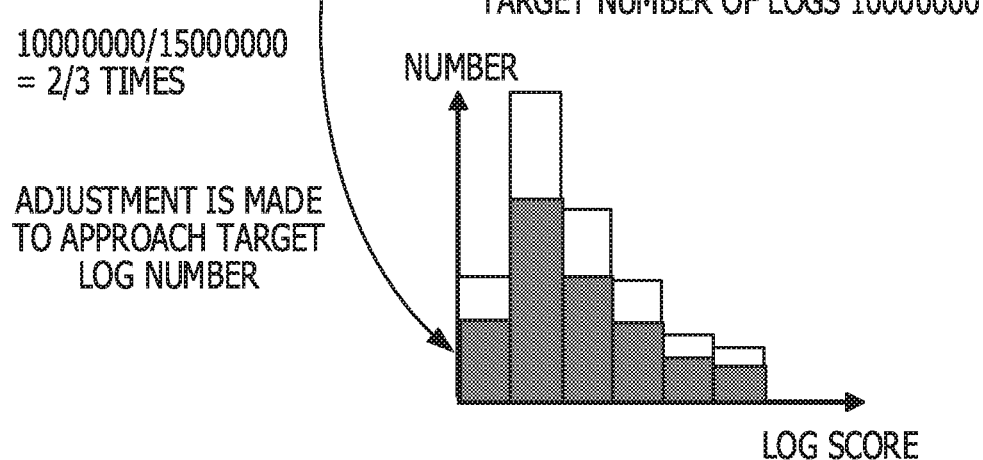

FIG. 6A to FIG. 6C are diagrams illustrating an example of adjustment of the entire log amounts of the distributed stream data processing platform 300 according to the embodiment with reference to FIGS. 3 and 4. The control unit 401 of the management apparatus acquires, for example, the number of logs output from the task 101 included in the distributed stream data processing platform 300 in a predetermined period (FIG. 6A). In the example illustrated in FIG. 6A to FIG. 6C, it is assumed that the total number of logs output in the predetermined period is 15,000,000.

The control unit 401 of the management apparatus totalizes the log number for each log score determined for each of the tasks 101 (FIG. 6B). In the example illustrated in FIG. 6A to FIG. 6C, a log score is divided into a predetermined range, and the number of logs of the task 101 having a log score corresponding to each range is totalized to form a graph.

Subsequently, the control unit 401 corrects the output frequency of the log in each task 101 so that the total number of logs of the distributed stream data processing platform 300 approaches a predetermined value as a target (FIG. 6C). In the example illustrated in FIG. 6A to FIG. 6C, since the total number of logs output in the predetermined period is 15,000,000 and the target number of the logs is 10,000,000, the output frequency of the log of each task 101 may be corrected so as to obtain an output frequency of 10,000,000/15,000,000=2/3 times.

As described above, the total amount of the logs output from the distributed stream data processing platform 300 may be adjusted to an appropriate amount with respect to the distributed stream data processing platform 300. Therefore, it is possible to suppress the processing load on the distributed stream data processing platform 300.

Figure 7:
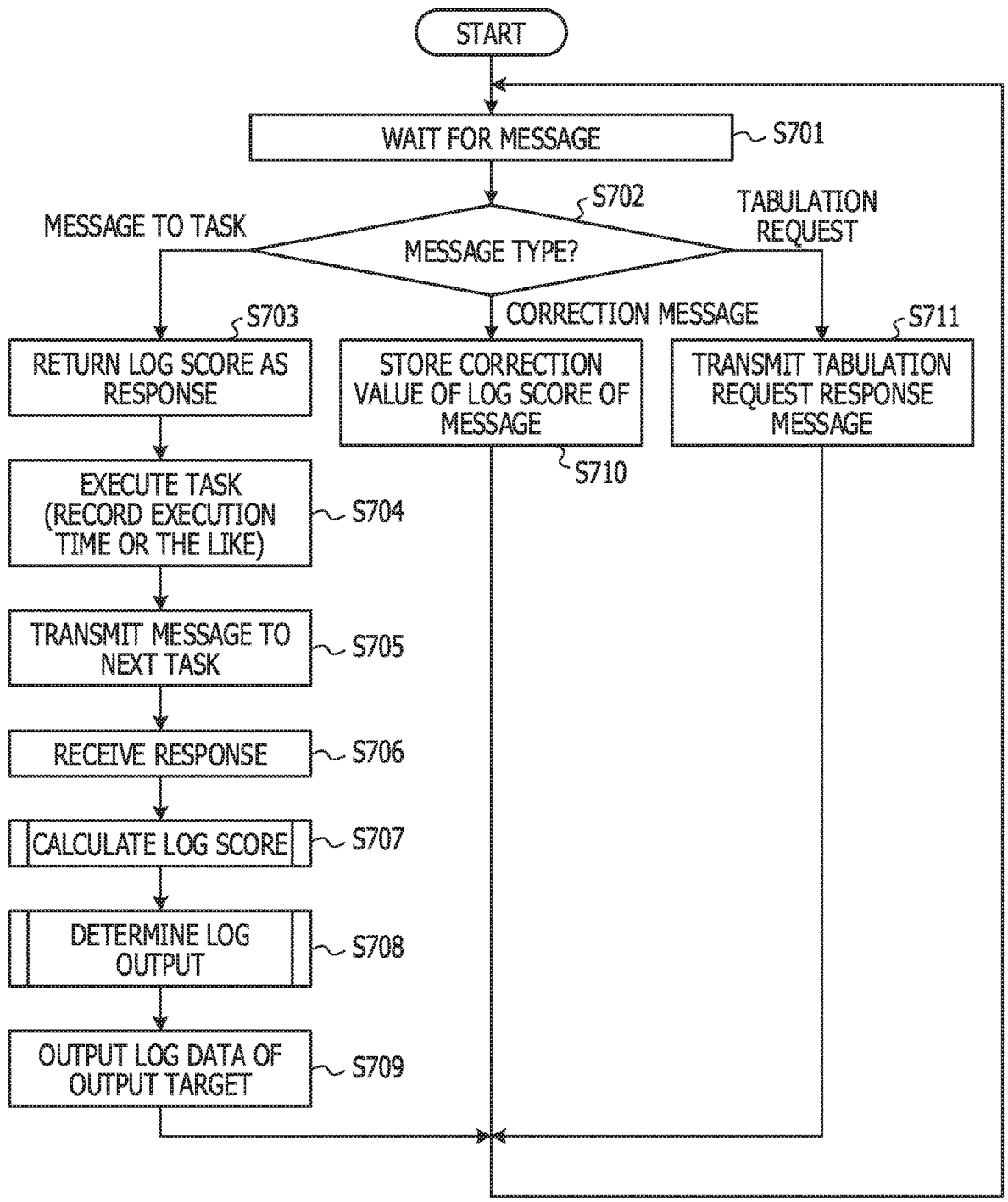
FIG. 7 is a diagram illustrating an operation flow of execution processing of the task according to the embodiment.

The execution processing of the task 101 accompanied with the output of the log according to the embodiment will be described below. FIG. 7 is a diagram illustrating an operation flow of execution processing of the task 101 according to the embodiment with reference to FIGS. 3 and 4. For example, when the execution instruction of the task 101 provided in the information processing apparatus 301 is input, the control unit 401 of the information processing apparatus 301 may start an operation flow of FIG. 7.

In step 701 (the term "step" is abbreviated as "S" hereinafter. For example, referred to as "S701"), the control unit 401 waits to receive a message. For example, when the message is received, the processing of the control unit 401 may proceed to S702.

In S702, the control unit 401 determines the type of the received message. When the message type is a message 801 (illustrated in FIG. 8A) addressed to the task 101 provided in the information processing apparatus 301, the flow proceeds to S703.

FIG. 8A and FIG. 8B are diagrams illustrating a message between tasks according to the embodiment. FIG. 8A illustrates the message 801 that is transmitted from the task 101 upstream to the task 101 downstream. The message 801 includes, for example, an upstream task identifier (ID), a downstream task ID, a log score of an upstream task, and a message for task processing.

The upstream task ID is, for example, identification information for identifying the task 101 upstream which transmits the message 801. The downstream task ID is, for example, identification information for identifying the task 101 downstream which is the destination of the message 801. The log score of the upstream task is a log score calculated for the task 101 upstream identified by the upstream task ID at the time of transmitting the message 801. The message for task processing may be, for example, information used in processing the task 101 downstream which is the destination of the message 801. The message for task processing may be information output as the execution result of the task 101 upstream, for example.

In S703, when receiving the message 801, the control unit 401 returns a response message 802 (illustrated in FIG. 8B) to the task 101 of a transmission source of the message 801 as a response to the message.

FIG. 8B is a diagram illustrating the response message 802 according to the embodiment. The response message 802 includes information on, for example, an upstream task ID, a downstream task ID, a log score of the downstream task. The upstream task ID is, for example, an identification information for identifying the task 101 that is the destination of the response message 802, which is the task 101 upstream that has transmitted the message 801. The downstream task ID is, for example, identification information for identifying the task 101 downstream which is a destination of the message 801, and which is a transmission source of the response message 802. The log score of the downstream task is a log score calculated for the task 101 downstream at the time of transmitting the response message 802. For example, the score information 900 may be registered in the storage unit 402 of the information processing apparatus 301, and the control unit 401 may acquire the log score of the downstream task from the score information 900.

FIG. 9 is a diagram illustrating score information 900 according to the embodiment. In the example illustrated in FIG. 9, the entry in which the task ID and the log score are associated with each other is registered in the score information 900. For the task ID of the score information 900, for example, a task ID for identifying the task 101 assigned to the information processing apparatus 301 may be registered. The log score of the score information 900 may be registered with the log score obtained for the task 101 identified by the task ID of the entry. The score information 900 may be, for example, generated in the operation flow of FIG. 14 to be described later, and stored in the storage unit 402 of the information processing apparatus 301. In S703, the control unit 401 may acquire, as a log score of the downstream task, a log score of the task ID matching the downstream task ID of the message 801 with reference to the score information 900, to generate a response message 802, and transmit the response message. By transmitting the response message 802, the task 101 upstream may be notified of the log score of the task 101 downstream.

In S704, the control unit 401 executes the task 101 designated as the transmission destination of the message 801. For example, the control unit 401 may execute the processing of the task 101 designated as a transmission destination to the downstream task ID of the message 801 by using the Information included in the message for task processing of the message 801. For example, the control unit 401 may temporarily store, in the storage unit 402, a log message to which an output request has been issued in the execution of the task 101. When executing the task 101, the control unit 401 may record the information related to the execution in task execution information 1000.

FIG. 10 is a diagram illustrating the task execution information 1000 according to the embodiment. The task execution information 1000 is registered with, for example, an entry in which a task ID, a time stamp, a processing time, and a CPU utilization rate are associated with each other. In one example, the control unit 401 may associate the task ID of the executed task 101 with the time stamp indicating the execution date and time, and associates the processing time for the task 101 with information on the CPU usage rate at the time of execution to the task 101 to register in the task execution information 1000.

In S705, the control unit 401 generates and transmits the message 801 to the task 101 downstream of the executed task 101. The control unit 401 may set, for example, the identification information of the executed task 101 to the upstream task ID of the message 801. The control unit 401 may set the log score of the score information 900 corresponding to the task ID of the executed task 101 to the log score of the upstream task of the message 801, and may set the execution result of the task 101 to the message for task processing of the message 801. The control unit 401 may set the identification information of the task 101 downstream to the downstream task ID of the message 801. The control unit 401 may transmit the generated message 801 to the task 101 downstream.

In S706, the control unit 401 receives the response message 802 from the task 101 downstream. In the upstream task ID of the response message 802, for example, the task ID of the task 101 that has transmitted the message 801 in S705 is registered. The transmission destination of the message 801 in S705, the task ID of the task 101 which is the transmission source of the response message 802 with respect to the message 801, and the log score are registered in the downstream task ID and the log score of the downstream task of the response message 802, respectively.

In S707, the control unit 401 calculates a log score for the task 101 executed in S704. The details of the log score calculation will be described later with reference to FIG. 14.

In S708, the control unit 401 determines whether or not to output a log message based on the log score calculated for the task 101 in S707. For example, the task 101 outputs an output request for requesting the output of the log at the time of execution. In S708, the control unit 401 may determine whether or not to output the log message requested to be output to the log data in the storage unit 402. The process for determining whether or not to output the log message will be described in detail later with reference to FIG. 15, for example.

In a case where it is determined that the log message is output in the processing of S708, in S709, the control unit 401 outputs and records the log message temporarily stored in the storage unit 402 to the log data in the storage unit 402. In this case, the control unit 401 updates the value by adding 1 to the number of outputs corresponding to the executed task 101 in log count information 1100 described below, and the flow returns to S701.

FIG. 11 is a diagram illustrating the log count information 1100 according to the embodiment. In the log count information 1100, for example, the number of outputs of the log messages is registered in association with the task ID of the task 101 assigned to the information processing apparatus 301. The number of outputs of the log messages registered in FIG. 11 may be the number of log messages actually output in S709, for example, during a predetermined period. In one example, a predetermined period for counting the number of output logs may be a period from the time when the log score correction message 1200 is stored in the storage unit 402 to the current time after the latest execution of the processing in S710 described later.

In a case where the message type is the log score correction message 1200 in S702, the flow proceeds to S710.

FIG. 12 is a diagram illustrating a log score correction message 1200 according to an embodiment. In the log score correction message 1200, for example, as described above with reference to FIG. 6A to FIG. 6C, a correction value for adjusting the output frequency of the log is registered in association with the task ID of each of the plurality of tasks 101 included in the distributed stream data processing platform 300.

In S710, the control unit 401 stores the received log score correction message 1200 in the storage unit 402, and the flow returns to S701. In a case where the log score correction message 1200 is already stored in the storage unit 402, the control unit 401 may update the log score correction message 1200 stored in the storage unit 402 with a new received log score correction message 1200.

In a case where the message type is a tabulation request in S702, the flow proceeds to S711. As described above with reference to FIG. 6A to FIG. 6C, the tabulation request is, for example, a message to be transmitted by the management apparatus for managing the distributed stream data processing platform 300 to totalize the total number of logs output from the distributed stream data processing platform 300 during a predetermined period. The tabulation request may include, for example, information indicating that the type of message is a tabulation request, and the control unit 401 may specify that the message is a tabulation request by referring to this information.

When the control unit 401 receives the tabulation request in S711, it generates a tabulation request response message 1300, responds to the information processing apparatus 301 which has transmitted the tabulation request, and returns the flow to S701.

FIG. 13 is a diagram illustrating a tabulation request response message 1300 according to the embodiment. The tabulation request response message 1300 includes, for example, an entry in which a task ID, a log score, and the number of outputs are associated with each other. When the control unit 401 of the information processing apparatus 301 receives the tabulation request from the management apparatus, for example, it generates a tabulation request response message 1300 including the task ID of each task 101 provided in the own apparatus itself, a log score, and the number of outputs of the log message. The log score registered in the tabulation request response message 1300 may be acquired from, for example, the score information 900. The number of outputs registered in the tabulation request response message 1300 may be acquired from, for example, the log count information 1100. The control unit 401 of the information processing apparatus 301 transmits the tabulation request response message 1300 generated in S711 to the information processing apparatus 301 operating as the management apparatus, for example.

According to the operation flow of FIG. 7 described above, for example, it is possible to calculate the log score at the time of executing the task 101, and to output the log message based on the log score. According to the operation flow of FIG. 7, for example, a correction value for adjusting the log amount in the entire distributed stream data processing platform 300 may be acquired, or the log score for the task 101 and the number of output logs may be notified to the management apparatus in response to the tabulation request from the management apparatus.

Figure 14:
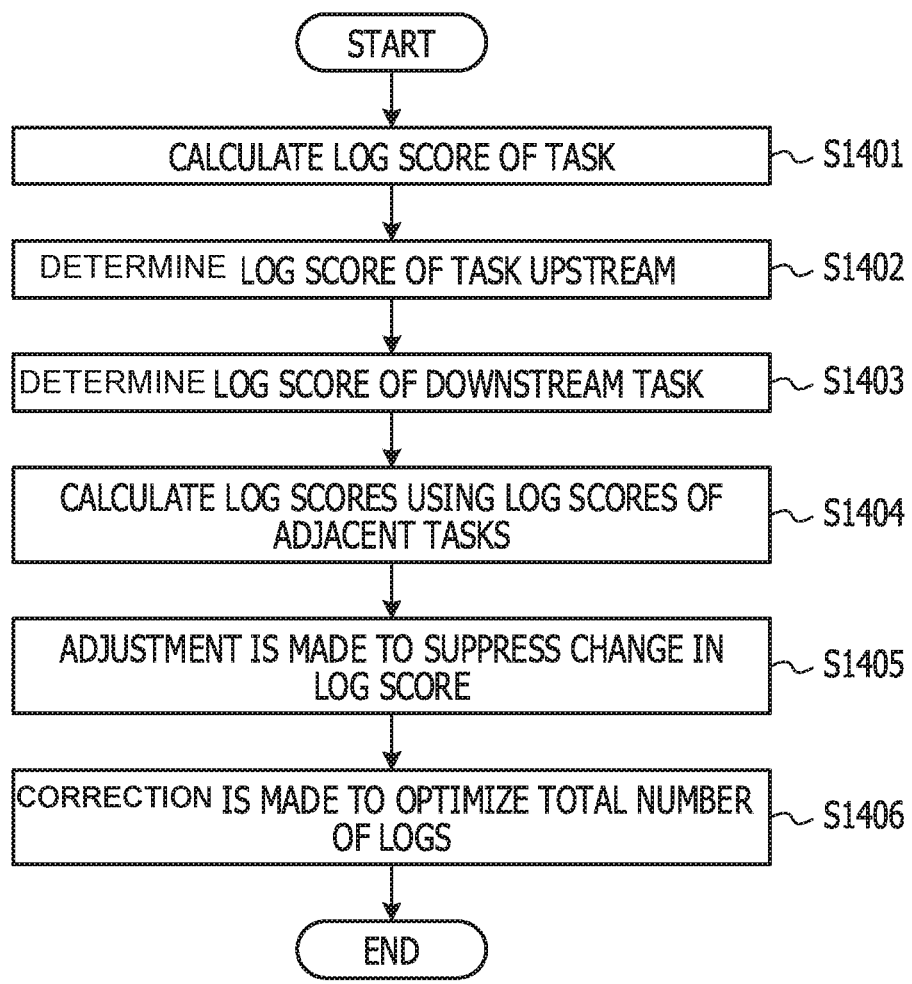
FIG. 14 is a diagram illustrating calculation processing the log score according to the embodiment.

Subsequently, the calculation of the log score will be described in more detail. FIG. 14 is a diagram illustrating calculation processing the log score according to the embodiment with reference to FIGS. 3, 4, and 10. The control unit 401 may start an operation flow illustrated in FIG. 14 when, for example, the processing proceeds to S707 in FIG. 7.

In S1401, the control unit 401 calculates a log score for each of the at least one of the tasks 101 provided in the information processing apparatus 301. For example, the control unit 401 may calculate the log score of the task 101 based on the information related to the execution of the past task 101 registered in the task execution information 1000. In the following description, an example of calculating a log score using the processing time of the task 101 as information relating to the execution of the task 101 will be described.

For example, in a case where the processing time of the task 101 is significantly longer than the normal processing time, it may be estimated that the task 101 is highly likely to cause a failure. Therefore, based on the difference from the normal processing time of the task 101, it is possible to obtain a log score in which the possibility of occurrence of the failure is evaluated. For example, it is assumed that an average of the processing time of the last 10 tasks 101 is set as $T_{ave}$. The processing time of the current task 101 is set as $T_{curr}$. In this case, the log score $S_{task}$ for the task 101 may be calculated, for example, by the following Equation 1. In Equation 1, abs represents an absolute value.

$$S_{task} = abs(T_{curr} - T_{ave})/T_{ave} \qquad \text{Equation 1}$$

According to Equation 1, the log score may be evaluated based on the difference from the past processing time. In another embodiment, the log score may be evaluated by using an occurrence frequency of errors of the task 101, an elapsed time since the task 101 is provided, a frequency at which the task 101 outputs the message of the output request of the logs, and the like.

In S1402, the control unit 401 determines the log score of the task 101 upstream based on the message 801 received from the task 101 upstream. For example, in a case where there is one task 101 upstream, the control unit 401 may use the log score of the upstream task of the latest message 801 received from the task 101 upstream. In a case where there are a plurality of tasks 101 upstream that have transmitted data to the task 101, the control unit 401 may determine a value representative of a log score of an upstream task of the latest message 801 received from each of the tasks 101 upstream as a log score of the task 101 upstream. For example, as indicated in Equation 2 below, the control unit 401 may use the average of the log scores of the plurality of tasks 101 upstream as the log score: $S_{upper}$ of the task 101 upstream. In Equation 2, ave represents an average, and $S_{u1}$, $S_{u2}$, $S_{u3}$, . . . represent log scores of a plurality of tasks 101 upstream.

$$S_{upper} = ave(S_{u1}, S_{u2}, S_{u3}, \ldots) \qquad \text{Equation 2}$$

In S1403, the control unit 401 determines the log score of the task 101 downstream based on the response message 802 received from the task 101 downstream. For example, in a case where there is one task 101 downstream, the control unit 401 may use the log score of the downstream task of the latest response message 802 received from the task 101 downstream. In a case where there are a plurality of tasks 101 downstream that have transmitted data to the task 101, the control unit 401 may determine a value representative of a log score of a downstream task of the latest response message 802 received from each of the tasks 101 downstream as a log score of the task 101 downstream. For example, as indicated in Equation 3 below, the control unit 401 may use the average of the log scores of the plurality of tasks 101 downstream as the log score: $S_{down}$ the task 101 downstream. In Equation 3, ave represents an average, and $S_{d1}, S_{d2}, S_{d3}, \ldots$ represent log scores of a plurality of tasks 101 downstream.

$$S_{down}=\text{ave}(S_{d1},S_{d2},S_{d3},\ldots)\qquad\text{Equation 2}$$

In S1404, the control unit 401 calculates a log score using the log scores of the adjacent tasks 101. For example, the control unit 401 may calculate the log score of the task 101 using the log score of the task 101 upstream of the task 101 obtained in S1402 and the log score of the task 101 downstream of the task 101 obtained in S1403. In one example, as indicated in Equation 4, the control unit 401 calculates the log score: $S_{current}$ by causing the log score of the task 101 in S1401, the log score of the task 101 upstream of S1402, and the log score of the task 101 downstream of S1403 to be contributed at a predetermined ratio.

$$S_{current}=0.5\times S_{task}+0.1\times S_{upper}+0.4\times S_{down}\qquad\text{Equation 4}$$

For example, the log scores of the adjacent tasks 101 may be contributed to the log score of the task 101 according to the above Equation 4. For example, in a case where a higher log score is set to a task 101 than another task 101, the value may also be propagated to the log scores of the adjacent tasks 101. When the failure occurs in the task 101, it is highly likely that the cause exists in the task 101 upstream rather than the task 101 downstream. In Equation 4, the coefficient of the log score $S_{down}$ of the task 101 downstream is set higher than the coefficient of the log score $S_{upper}$ of the task upstream, so that the influence of the log score of the task 101 downstream is more easily affected than that of the task 101 upstream. Although an example in which the log scores of both the task 101 upstream and the task 101 downstream are used for the calculation of the log score of the task 101 is indicated in Equation 4, the embodiment is not limited thereto. In another embodiment, only one of the task 101 upstream and the task 101 downstream may be used to calculate the log score of the task 101.

In S1405, the control unit 401 adjusts the log score to suppress a change in the log score. For example, in a case where the value of the log score drops abruptly and the frequency of taking a log drops abruptly, a sufficient log for pursuing the cause of the failure may not be taken. Therefore, in S1405, the control unit 401 performs adjustment to moderate the change of the log score. For example, as indicated in Equation 5 below, by causing the $S_{current}$ currently calculated in S1404 to contribute to the log score: $S_{base-1}$ previously calculated in S1405 in the execution of the operation flow illustrated in FIG. 14 at a predetermined ratio, the adjustment to suppress the change in the log score is possible.

$$S_{base}=0.5\times S_{current}+0.5\times S_{base-1}\qquad\text{Equation 5}$$

In Equation 5, the log score: $S_{base-1}$ previously calculated in S1405 in the execution of the operation flow illustrated in FIG. 14 and the $S_{current}$ currently calculated in S1404 are made to contribute at a rate of 50%, thereby obtaining a log score $S_{base}$. In addition, the control unit 401 may register the log score $S_{base}$ obtained in the task 101 in S1405 in association with the task ID of the task 101 in the score information 900. In a case where the entry including the task ID of the task 101 obtained by obtaining the log score in S1405 is already registered in the score information 900, the log score of the entry of the score information 900 may be updated with the latest log score obtained in S1405.

In S1406, the control unit 401 performs correction so as to optimize the total number of logs. For example, as will be described later with reference to FIG. 16, the management apparatus executing the management of the distributed stream data processing platform 300 obtains a correction value for the task 101 to optimize the total number of logs, and notifies the information processing apparatus 301 executing the task 101 of the correction value. In the processing in S1406, in a case where the correction value for the task 101 is notified from the management apparatus performing the management of the distributed stream data processing platform 300, the control unit 401 may correct the $S_{base}$ of S1405 with the notified correction value to obtain the final log score S. In a case where the correction value for the task 101 is not yet notified from the management apparatus, such as the initial operation of the distributed stream data processing platform 300, the processing in S1406 may be omitted. Equation 6 illustrating an example of the correction of the log score of the task 101 executed in the processing in S1406.

$$S=\min(1,\max(0,S_{base}\times W))\qquad\text{Equation 6}$$

In Equation 6, W is a correction value for the task 101. In Equation 6, the value of the log score S falls within the range of 0 to 1 by using a function of min and max. When the processing in S1406 is completed, the operation flow in FIG. 14 ends, and the flow proceeds to S708. With the operation flow illustrated in FIG. 14 described above, the control unit 401 may acquire the log score of the task 101.

Figure 15:
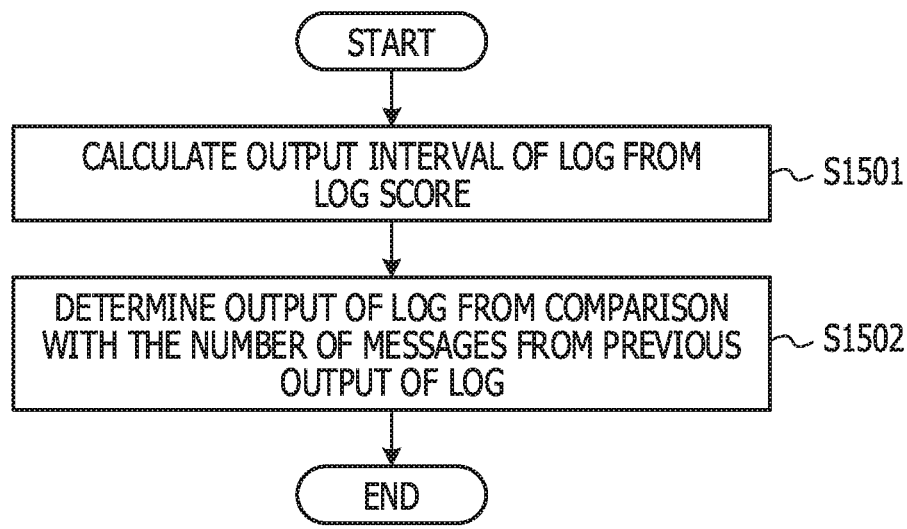
FIG. 15 is a diagram illustrating log output determination processing according to the embodiment.

Next, log output determination processing executed in S708 in FIG. 7 will be described. FIG. 15 is a diagram illustrating the log output determination processing according to the embodiment. The control unit 401 may start an operation flow illustrated in FIG. 15 when, for example, the processing proceeds to S708.

In S1501, the control unit 401 calculates an output interval of the logs based on the log score. The output interval of the logs may be calculated by, for example, the following Equation 7. In Equation 7, round is a function for rounding off the decimal point or less, so that the value of the N is made an integer.

$$N_{interval}=\text{round}(1/S)\qquad\text{Equation 7}$$

In S1502, the control unit 401 determines whether to output the log message by comparing the number of log messages for which an output request has been issued after the output of the previous log message with the log output interval obtained in S1501. For example, the control unit 401 may determine that the log message is output in a case where the number $N_{before}$ of the message of the output request of the log output after the output of the previous log message is larger than the $N_{interval}$ ($N_{before}>N_{interval}$). When the processing in S1502 is completed, the operation flow in FIG. 15 ends, and the flow proceeds to S709. With the operation flow in FIG. 15 described above, the control unit 401 may determine whether or not to output the log message to the output request of the log output from the task 101 executed in the operation flow illustrated in FIG. 7. As a result, the output frequency of the log message of the task 101 is determined based on the log score.

Figure 16:
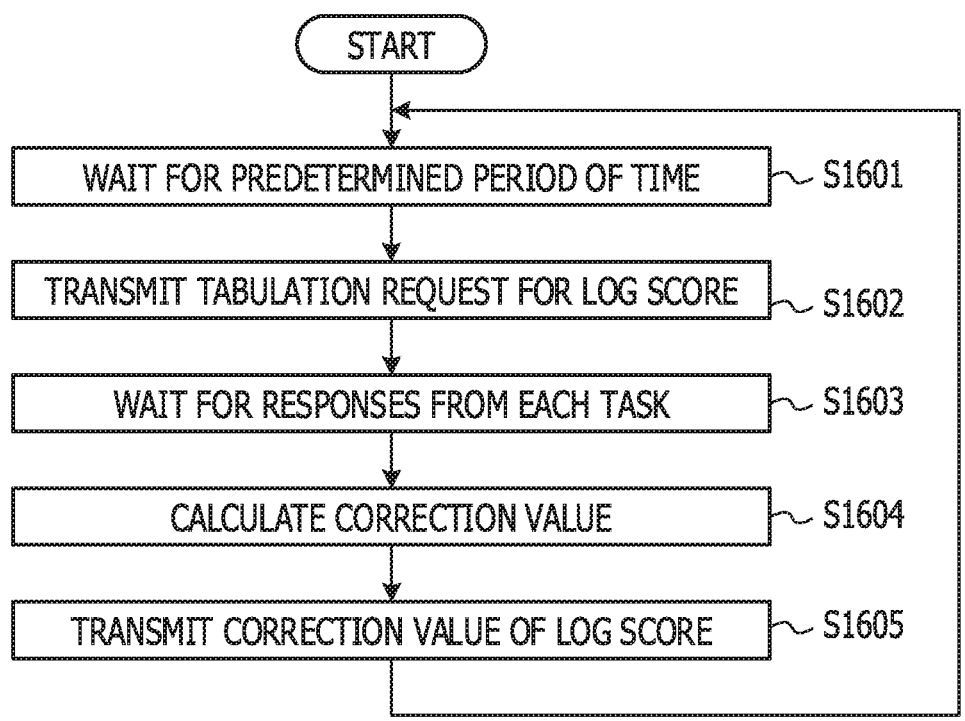
FIG. 16 is a diagram illustrating an operation flow of optimization processing of the log amounts according to the embodiment.

Next, the optimization of the entire log amount will be described with reference to FIGS. 3, 4, and 16. FIG. 16 is a diagram illustrating an operation flow of optimization processing of the log amount executed by the control unit 401 of the management apparatus that executes the management of the distributed stream data processing platform 300. In one example, the management apparatus for executing the management of the distributed stream data processing platform 300 may be the information processing apparatus 301 representative of a plurality of information processing apparatuses 301 included in the distributed stream data processing platform 300. The control unit 401 of the management apparatus may start the operation flow of FIG. 16 when the distributed stream data processing platform 300 is activated.

In S1601, the control unit 401 of the management apparatus waits for a predetermined period of time. In one example, the administrator of the distributed stream data processing platform 300 may estimate the waiting time for which it is possible to see the tendency of the output of the log in the distributed stream data processing platform 300, and may set the time in advance as a predetermined time.

In S1602, the control unit 401 of the management apparatus transmits a tabulation request for a log score to the information processing apparatus 301 included in the distributed stream data processing platform 300. For example, the control unit 401 of the management apparatus may transmit the tabulation request to each of the plurality of information processing apparatuses 301 responsible for the execution of the task 101 in the distributed stream data processing platform 300.

In S1603, the control unit 401 of the management apparatus waits for a response from each of the information processing apparatuses 301. The response from each of the information processing apparatuses 301 may be, for example, the tabulation request response message 1300 described above.

In S1604, when the reception of the tabulation request response message 1300 from each of the information processing apparatuses 301 is completed, the control unit 401 of the management apparatus calculates a correction value using the received tabulation request response message 1300. For example, when the number of outputs of the log messages of each task 101 is $N_{t1}, N_{t2}, N_{t3}, \ldots$, a correction value W may be obtained by the following Equation 8. Z is a target log message number, which may be set in advance by the administrator of the distributed stream data processing platform 300.

$$W = Z/(N_{t1}+N_{t2}+N_{t3}+ \ldots) \quad \text{Equation 8}$$

In S1605, the control unit 401 of the management apparatus generates a log score correction message 1200 including the obtained correction value, transmits the log score correction message to each of the information processing apparatuses 301, and ends the operation flow.

According to the operation flow of FIG. 16, the control unit 401 of the management apparatus may notify each of the information processing apparatuses 301 of a correction value for optimizing the entire log amount of the distributed stream data processing platform 300.

In the operation flow of FIG. 16, an example in which a uniform correction value W is determined for all of the tasks 101 included in the distributed stream data processing platform 300 and correction is performed is described, but the embodiments are not limited thereto. For example, in another embodiment, a correction value may be defined to correct the output frequency of the log at different values in response to the task 101.

For example, since the task 101 having a high log score notified by the tabulation request response message 1300 is estimated to output a log frequently, even if the amount of log to be output is greatly reduced more than that of other tasks, it is highly likely that a log sufficient for analyzing a failure may be acquired. For example, in a case where the correction value W obtained in Equation 8 is 0.8, a lower correction value (for example, 0.7) or the like may be set for the task 101 having a high log score. On the other hand, since the task 101 having a low log score notified in the tabulation request response message 1300 may have a small number of logs to be output, if the number of the logs is smaller than that, the logs available at the time of the occurrence of the failure or the like may become insufficient. For example, in a case where the correction value W obtained in Equation 8 is 0.8, a higher correction value (for example, 0.9) or the like may be set for the task 101 having a low log score. In this manner, the control unit 401 may adjust the correction value based on the log score for each task 101.

As described above, according to the above embodiments, when there is a task 101 having a high possibility of a failure, the output frequency of logs of tasks 101 around the task 101 is increased, so that it is possible to effectively collect a trace log or the like. As a result, it is possible to efficiently find the failure in which the plurality of tasks 101 are affected.

Although the example of the embodiment has been described, the embodiment is not limited to this. For example, the operation flows described above are exemplary, and the embodiment is not limited to these. Where possible, the order of performing the types of processing in the operation flows may be changed, the operation flow may further include a different type of processing, or a subset of the types of the processing may be omitted. For example, the processing of S1402 and the processing of S1403 in FIG. 14 may be executed by changing the order.

In the log score calculation in the above-described embodiment, the elapsed time after the task 101 is provided in the distributed stream data processing platform 300 may be taken into consideration. For example, in situations where the task 101 is not provided, it is highly possible that a bug or the like that is not expected by the developer of the task 101 is included. The control unit 401 may perform processing for correcting the log score of the task 101, which has been just provided in this manner, to a higher value.

In the above embodiments, an example in which the higher the log score value as a numerical value, the higher the log output frequency is described. However, the embodiments are not limited thereto, and for example, the log score may be evaluated in such a manner that the smaller the log score value, the higher the log output frequency. In this case, the small value of the log score may indicate the high log score.

In the above embodiments, an example in which the average value is used as representative values representing the log scores of the plurality of upstream tasks 101 and the log scores of the plurality of downstream tasks 101 is described, but the embodiments are not limited to this example. For example, in another embodiment, other statistics, such as a median value, may be used as a representative value.

In the embodiments described above, the message between the tasks illustrated in FIGS. 8A and 8B may further include information such as the address of the information processing apparatus 301 in which the destination task 101 is disposed, in a case where the destination task 101 is disposed in the another information processing apparatus 301.

In the above embodiments, an example in which the log score is corrected by a correction value is described, but the embodiments are not limited thereto, and the output frequency of the logs of the task 101 may be adjusted by using the correction values for correction of other values. For example, in another embodiment, in place of the processing of S1406 described above, in S1501, processing for correcting the output interval $N_{interval}$ of the log by the inverse of the correction value W may be executed in the following Equation 9. In this case, the control unit 401 may execute the processing in S1502 using the obtained $N_c$ instead of the $N_{interval}$.

$$N_c = N_{interval} \times 1/W \qquad \text{Equation 9}$$

In the above embodiments, in the processing of S1401, the control unit 401 of the information processing apparatus 301 operates as, for example, the acquisition unit 411. The control unit 401 of the information processing apparatus 301 may operate as the output unit 412 in the processing of, for example, from S709 and S1402 to S1406. In the processing of the operation flow of FIG. 16, the control unit 401 of the information processing apparatus 301 operates as, for example, the determination unit 413.

Figure 17:
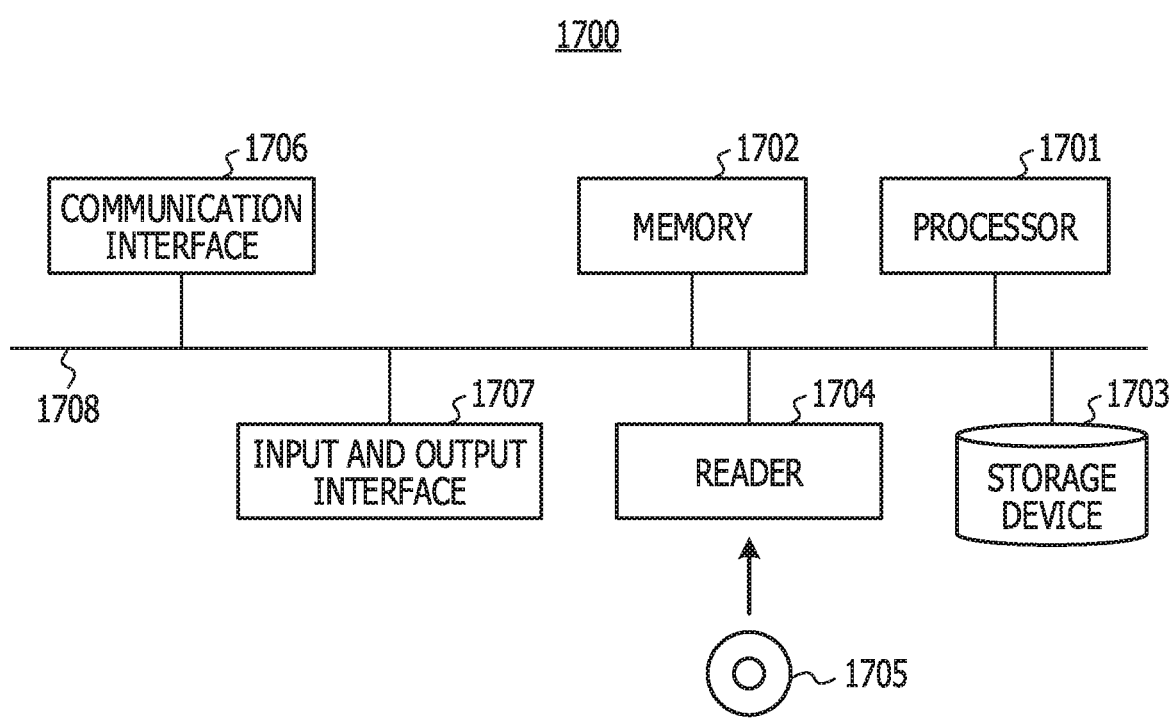
FIG. 17 is a diagram illustrating a hardware configuration of a computer for realizing the information processing apparatus and a management apparatus according to the embodiment.

FIG. 17 is a diagram illustrating a hardware configuration of a computer 1700 for realizing the information processing apparatus 301 illustrated in FIG. 3 and a management apparatus according to the embodiment. In FIG. 17, the hardware configuration for realizing the information processing apparatus 301 and the management apparatus includes a processor 1701, a memory 1702, a storage device 1703, a reader 1704, a communication interface 1706, and an input and output interface 1707, for example. The processor 1701, the memory 1702, the storage device 1703, the reader 1704, the communication interface 1706, and the input and output interface 1707 are coupled to one another through, for example, a bus 1708.

The processor 1701 may be, for example, a single processor, a multiple processor, or a multi-core processor. The processor 1701 uses the memory 1702 to execute a program in which the procedures for the aforementioned operation flows are described, thereby enabling some or all of the functions of the aforementioned control unit 401 illustrated in FIG. 4, for example. For example, the processor 1701 of the information processing apparatus 301 and the management apparatus reads and executes a program that is stored in the storage device 1703, and thereby the processor 1701 functions as the acquisition unit 411, the output unit 412, and the determination unit 413.

The memory 1702 is, for example, semiconductor memory and may include a ROM area and a RAM area. The storage device 1703 is, for example, a hard-disk drive, semiconductor memory such as flash memory, or an external storage device. The RAM is an abbreviation for a random-access memory. The ROM is an abbreviation for a read-only memory.

The reader 1704 accesses the removable storage medium 1705 in accordance with an instruction from the processor 1701. For example, the removable storage medium 1705 is realized by a semiconductor device (USB memory or the like), a medium (a magnetic disk or the like) to which information is input and output by a magnetic action, a medium (CD-ROM, DVD, or the like) to which information is input and output by an optical action. The USB is an abbreviation for a Universal Serial Bus. The CD is an abbreviation for a compact disc. The DVD is an abbreviation for a digital versatile disk.

The information processing apparatus 301 and the storage unit 402 of the management apparatus may include, for example, a memory 1702, a storage device 1703, and a removable storage medium 1705. For example, the score information 900, the task execution information 1000, the log count information 1100, and the log score correction message 1200 illustrated in FIGS. 9-12 may be stored in the storage device 1703 of the information processing apparatus 301. For example, the log score correction message 1200 and the tabulation request response message 1300 may be stored in the storage device 1703 of the management apparatus.

The communication interface 1706 transmits and receives data via a network, in accordance with an instruction of the processor 1701. The communication interface 1706 is, for example, an example of the above-described communication unit 403. The input and output interface 1707 may be, for example, an interface between an input device and an output device. The input device is, for example, a device accepting instructions from the user such as a keyboard or a mouse. For example, the output device is a printing device such as a display and a sound device such as a printer.

Each program according to the embodiment is provided to the information processing apparatus 301 and the management apparatus in the following form, for example.

1) A subset or all of the programs are installed in advance in the storage device 1703.

2) A subset or all of the programs are provided from the removable storage medium 1705.

3) A subset or all of the programs are provided from a server such as a program server.

The hardware configuration of the computer 1700 for realizing the information processing apparatus 301 and the management apparatus, which is described with reference to FIG. 17 is an example. The embodiments are not limited thereto. For example, a subset or all of the functions of the above-described control unit 401 may be implemented as hardware such as an FPGA or an SoC. The FPGA is an abbreviation for a field-programmable gate array. The SoC is an abbreviation for a system-on-a-chip.

Some embodiments have been described above. However, the embodiments are not limited to the above-described embodiments. It is to be appreciated that the embodiments include a number of types of variations and alternatives of the above-described embodiments. For example, it would be appreciated that various types of embodiments are able to be embodied by modifying the elements without departing from the scope of the gist of the embodiments. It would also be appreciated that various types of embodiments are able to be implemented by appropriately combining a plurality of the elements disclosed according to the above-described embodiment. Also, one skilled in the art would appreciate that various types of embodiments are able to be implemented by deleting or replacing a subset of the elements out of all the elements described according to the embodiment or adding an element or elements to the elements described according to the embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus, comprising:
a memory; and
a processor, coupled to the memory, configured to:
determine, for each task of a plurality of tasks executed in a distributed stream data processing platform, a log score based on an indication associated with easiness of occurrence of a failure;
output a log message for each task of the plurality of tasks at an output frequency determined based on a log score of the task and a log score of at least one of an upstream task located upstream of the task and a downstream task located downstream of the task; and
in the plurality of tasks, a first downstream task is disposed downstream of a first task and the first downstream task and a second downstream task are disposed downstream of a second task,
output a log message of the first task at a higher output frequency than that of the second task when a log score of the first downstream task is higher than that of the second downstream task,
the log score for each task is determined according to at least one of a processing time of the task, a load applied to the processor for the task, and an amount of memory used for the task.

2. The information processing apparatus according to claim 1, wherein in the plurality of tasks,
a first upstream task is disposed upstream of a third task and
the first upstream task and a second upstream task are disposed upstream of a fourth task, and
wherein the processor is configured to output a log message of the third task at a higher output frequency than that of the fourth task when a log score of the first upstream task is higher than that of the second upstream task.

3. The information processing apparatus according to claim 1, wherein the processor is configured to adjust the output frequency of the log message of the task based on a correction value set to bring a total number of log messages output in the distributed stream data processing platform close to a predetermined number.

4. The information processing apparatus according to claim 3, wherein the processor is configured to determine the correction value based on a number of outputs of the log message output in each of the plurality of tasks during a predetermined period.

5. A method of causing a processor to execute a process, the process comprising:
determining, for each task of a plurality of tasks executed in a distributed stream data processing platform, a log score based on an indication associated with easiness of occurrence of a failure;
outputting a log message for each task of the plurality of tasks at an output frequency determined based on a log score of the task and a log score of at least one of an upstream task located upstream of the task and a downstream task located downstream of the task; and
in the plurality of tasks, a first downstream task is disposed downstream of a first task and the first downstream task and a second downstream task are disposed downstream of a second task,
outputting a log message of the first task at a higher output frequency than that of the second task when a log score of the first downstream task is higher than that of the second downstream task,
the log score for each task is determined according to at least one of a processing time of the task, a load applied to the processor for the task, and an amount of memory used for the task.

6. A non-transitory computer-readable recording medium having stored therein a program for causing a processor to execute a process, the process comprising:
determining, for each task of a plurality of tasks executed in a distributed stream data processing platform, a log score based on an indication associated with easiness of occurrence of a failure;
outputting a log message for each task of the plurality of tasks at an output frequency determined based on a log score of the task and a log score of at least one of an upstream task located upstream of the task and a downstream task located downstream of the task; and
in the plurality of tasks, a first downstream task is disposed downstream of a first task and the first downstream task and a second downstream task are disposed downstream of a second task,
outputting a log message of the first task at a higher output frequency than that of the second task when a log score of the first downstream task is higher than that of the second downstream task,
the log score for each task is determined according to at least one of a processing time of the task, a load applied to the processor for the task, and an amount of memory used for the task.

* * * * *